(12) United States Patent
Dishman et al.

(10) Patent No.: US 7,888,919 B2
(45) Date of Patent: Feb. 15, 2011

(54) APPARATUS, SYSTEM, AND METHOD FOR AN ADAPTIVE HIGH EFFICIENCY SWITCHING POWER SUPPLY

(75) Inventors: Cecil C. Dishman, Raleigh, NC (US); Randhir S. Malik, Cary, NC (US)

(73) Assignee: International Business Machines Corporation, Armonk, NY (US)

(*) Notice: Subject to any disclaimer, the term of this patent is extended or adjusted under 35 U.S.C. 154(b) by 400 days.

(21) Appl. No.: 12/052,444

(22) Filed: Mar. 20, 2008

(65) Prior Publication Data
US 2009/0237057 A1  Sep. 24, 2009

(51) Int. Cl.
*G05F 1/575* (2006.01)
*G05F 1/563* (2006.01)

(52) U.S. Cl. .................. 323/266; 323/284; 323/285

(58) Field of Classification Search .......... 323/271, 323/282, 284, 285, 266; 363/89
See application file for complete search history.

(56) References Cited

U.S. PATENT DOCUMENTS

| | | | |
|---|---|---|---|
| 4,510,400 A | 4/1985 | Kiteley | |
| 4,750,102 A * | 6/1988 | Yamano et al. | 363/142 |
| 5,268,832 A * | 12/1993 | Kandatsu | 363/95 |
| 6,972,974 B2 | 12/2005 | Inn et al. | |
| 2007/0057658 A1 | 3/2007 | Hasegawa | |
| 2007/0075698 A1 | 4/2007 | Xi et al. | |
| 2007/0080674 A1 | 4/2007 | Gray et al. | |

FOREIGN PATENT DOCUMENTS

JP  11069788  3/1999

* cited by examiner

*Primary Examiner*—Gary L Laxton
(74) *Attorney, Agent, or Firm*—Kunzler Needham Massey & Thorpe

(57) ABSTRACT

An apparatus, system, and method are disclosed for an adaptive high efficiency switching power supply. The switching power supply has a regulation stage with a stage controller that operates to regulate a voltage of the regulation stage relative to a reference voltage. A power detection module detects an amount of power used by the switching power supply. A low power module determines if the power supply is operating below a minimum power capacity threshold. A stage voltage adjustment module adjusts the reference voltage from a high power reference voltage to a low power reference voltage in response to the low power module determining that the power supply is operating below the minimum power capacity threshold. The low power reference voltage causes a regulated voltage adjustment such that the switching power supply operates more efficiently below the minimum power threshold.

20 Claims, 6 Drawing Sheets

APPARATUS, SYSTEM, AND METHOD FOR AN ADAPTIVE HIGH EFFICIENCY SWITCHING POWER SUPPLY

BACKGROUND OF THE INVENTION

1. Field of the Invention

This invention relates to power supplies, and more particularly relates to adaptively increasing the efficiency of a switching power supply.

2. Description of the Related Art

A power supply, sometimes known as a power supply unit or PSU, is a device or system that supplies electrical or other types of energy to an output load or group of loads. A power supply, in some embodiments may be configured to convert power in one form to another form, such as converting AC power to DC power. The regulation of power supplies is typically done by incorporating feedback and control circuitry to tightly control the output voltage or current of the power supply to a specific value. The specific value is closely maintained despite variations in the load presented to the power supply's output, or any reasonable voltage variation at the power supply's input. A switching power supply is a power supply that incorporates a switching regulator that typically switches a power transistor, usually a metal-oxide-semiconductor field-effect transistor ("MOSFET"), between saturation and cutoff with a controller to maintain a constant output voltage.

For example, in an electrical device such as a computer, a switching power supply is typically designed to convert an AC input voltage, such as is traditionally provided by a conventional wall socket, into one or more low-voltage DC power outputs for transmission to internal components of the device. Conversion is sometimes performed in stages that may include different power supply topologies such as a rectification stage, a boost stage, buck stage, or other topology.

In some instances, the switching power supply may also incorporate circuitry to perform active power factor correction. Active power factor correction is typically performed in a boost converter that substantially maintains a constant DC bus voltage on its output while drawing a current that is in phase with and at the same frequency as the line voltage.

Additional stages in the power supply may utilize the DC bus voltage provided by the boost converter to produce desired output voltages for use by electronic devices. A typical boost converter with active power factor correction might regulate the DC bus voltage to substantially mirror a set reference voltage or set point of about 400 Volts. However, in a typical switching power supply this may result in an efficiency of less than 80% when operating at a 20% load. This is significant because the Environmental Protection Agency requires that in order to be compliant with energy consumption regulations, a switching power supply must operate at least above 80% efficiency when operating at 20% of the full load capacity of the switching power supply.

Conventional art addresses this problem by utilizing expensive devices and magnetics to meet the efficiency requirements. However, none of the conventional art currently available has provided a cost effective means for satisfactorily meeting efficiency requirements when operating at lower loads. Thus, there is a need for an adaptive low-cost switching power supply with improved efficiency at relatively low loads.

SUMMARY OF THE INVENTION

From the foregoing discussion, it should be apparent that a need exists for an apparatus, system, and method that provide an adaptive switching power supply for increasing the efficiency of the switching power supply during low load conditions. The present invention has been developed in response to the present state of the art, and in particular, in response to the problems and needs in the art that have not yet been fully solved by currently available redundant power supplies.

In one embodiment, the apparatus for efficiently regulating a power supply includes a power detection module, a low power module, and a stage voltage adjustment module. The power detection module detects an amount of power used by a switching power supply. The switching power supply preferably includes a regulation stage with a stage controller that operates to regulate a voltage of the regulation stage relative to a reference voltage. The low power module determines if the amount of power used by the switching power supply is below a minimum power capacity threshold.

The stage voltage adjustment module adjusts the reference voltage from a high power reference voltage, or normal operating reference voltage, to a low power reference voltage in response to the low power module determining that the amount of power used by the power supply is below the minimum power capacity threshold. The low power reference voltage causes a regulated voltage adjustment such that the switching power supply operates more efficiently below the minimum power threshold than if the reference voltage remained at the high power reference voltage during operation below the minimum power threshold.

In one embodiment, the regulation stage is a boost converter stage configured to provide a regulated voltage that is greater than an input voltage. In further embodiments, the regulated voltage is maintained above a minimum regulation voltage threshold relative to the input voltage in order to maintain proper boost operation, and when the reference voltage is at the high power reference voltage, the regulated voltage is greater than the regulated voltage when the reference voltage is at the low power reference voltage.

In one embodiment, the regulation stage operates to perform active power factor correction. In a further embodiment, when the reference voltage is at the low power reference voltage, the regulated voltage is greater than a power factor correction voltage threshold, the power factor correction voltage threshold corresponding to a minimum regulated voltage relative to an input voltage at which active power factor correction remains substantially operable. In another embodiment, the stage voltage adjustment module adjusts the low power reference voltage continuously relative to the amount of power detected by the power detection module.

In one embodiment, the apparatus includes a holdup module that operates to provide sufficient stored energy to the regulation stage to maintain the regulated voltage relative to the low power reference voltage for a predetermined period of time in response to a loss of an input voltage. In a further embodiment, the apparatus also includes an input voltage detection module that detects the loss of the input voltage by determining that the input voltage has fallen below a minimum input voltage threshold. In yet a further embodiment, the input voltage detection module may detect the loss of the input voltage by monitoring a slope of the input voltage and detecting that the input voltage is decreasing at a rate greater than a predetermined slope threshold. The holdup module may include a capacitor and a switch. The capacitor stores energy sufficient to maintain the regulated voltage relative to the low power reference voltage for the predetermined period of time. The switch is configured to provide the stored energy to the regulation stage in response to the loss of the input voltage. In one embodiment, the predetermined period of time is equal to or greater than about 20 milliseconds.

In at least one embodiment, adjusting to the low load reference voltage results in the switching power supply operating at least at 80% efficiency when operating at 20% of the full load capacity of the power supply. In yet another embodiment, the stage voltage adjustment module may adjust the reference voltage from the low power reference voltage to the high power reference voltage in response to the low power module determining that the amount of power used by the switching power supply is above the minimum power capacity threshold.

A system and method of the present invention are also presented. The system and method in the disclosed embodiments substantially include the steps necessary to carry out the functions presented above with respect to the operation of the described apparatus.

The system, in one embodiment, includes an electronic device that includes a load. The switching power supply provides power to the load of the electronic device. In one embodiment, the switching power supply includes a regulation stage with a stage controller that operates to regulate a voltage of the regulation stage relative to a reference voltage. The switching power supply may include a power detection module, a low power module, and a stage voltage adjustment module.

The power detection module detects an amount of power used by a switching power supply, and the switching power supply preferably includes a regulation stage with a stage controller that operates to regulate a voltage of the regulation stage relative to a reference voltage. The low power module determines if the amount of power used by the switching power supply is below a minimum power capacity threshold. The stage voltage adjustment module adjusts the reference voltage from a high power reference voltage to a low power reference voltage in response to the low power module determining that the amount of power used by the power supply is below the minimum power capacity threshold. The low power reference voltage causes a regulated voltage adjustment such that the switching power supply operates more efficiently below the minimum power threshold than if the reference voltage remained at the high power reference voltage during operation below the minimum power threshold.

In a further embodiment, the switching power supply includes a holdup module that operates to provide sufficient stored energy to the regulation stage to maintain the regulated voltage relative to the low power reference voltage for a predetermined period of time in response to a failure of an input voltage. In the embodiment, the holdup module includes a capacitor and a switch. The capacitor stores the energy. The switch provides the stored energy to the regulation stage in response to a loss of the input voltage.

In further embodiments of the system, the switching power supply includes an input filter that rectifies an alternating current ("AC") input voltage and filters out harmonic content. In one embodiment, the electronic device is one of a computer, router, switch, personal digital assistant, appliance, and digital media player. In various embodiments, the switching power supply is integrated within the electronic device.

A method of the present invention is also presented for efficiently regulating a power supply. In one embodiment, the method may be implemented as a computer program product comprising a computer readable medium having computer usable program code stored on a tangible medium and executable on a processor. The method in the disclosed embodiments substantially includes the steps necessary to carry out the functions presented above with respect to the operation of the described apparatus and system. The method includes detecting an amount of power used by a switching power supply. The switching power supply includes a regulation stage with a stage controller that operates to regulate a voltage of the regulation stage relative to a reference voltage. The method includes determining if the amount of power used by the switching power supply is below a minimum power capacity threshold.

The method includes adjusting the reference voltage from a high power reference voltage to a low power reference voltage in response to the low power module determining that the power supply is operating below the minimum power capacity threshold. Preferably, the low power reference voltage causes a regulated voltage adjustment such that the switching power supply operates more efficiently below the minimum power threshold than if the reference voltage remained at the high power reference voltage during operation below the minimum power threshold.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
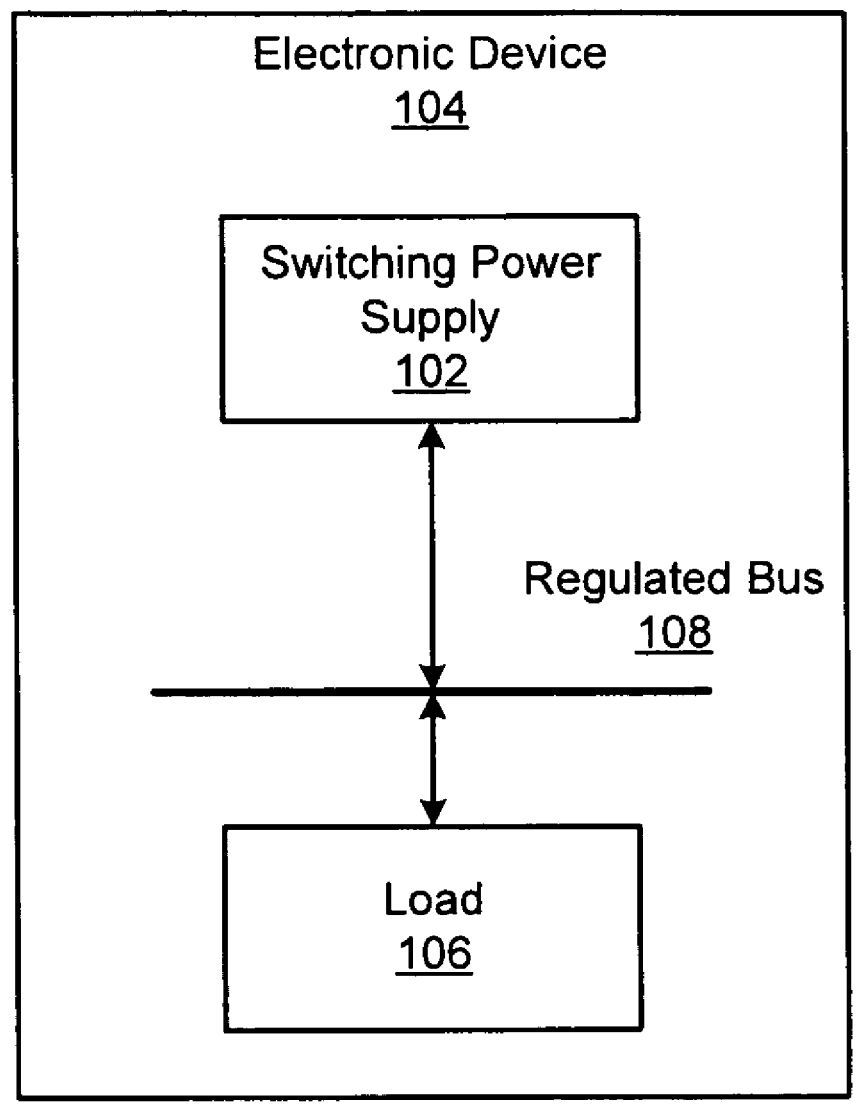
FIG. 1 is a schematic block diagram illustrating one embodiment of a system with a switching power supply for providing increased power efficiency in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable media.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any form capable of storing machine-readable instructions on a digital processing apparatus. A computer readable medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

FIG. 1 is a schematic block diagram illustrating one embodiment of a system 100 with a switching power supply 102 that operates efficiently at a low load condition in accordance with the present invention. The system 100 includes an electronic device 104, a switching power supply 102, a regulated bus 108, and a load 106.

In one embodiment, the switching power supply 102 provides regulated power to the electronic device 104 to power various electronic systems and subsystems within the electronic device 104. The switching power supply 102 is typically connected to the electronic device 104 by a regulated bus 108. The regulated bus 108 and switching power supply 102 may be configured to provide one or more different voltages and currents to the electronic device 104. For example, in a typical switching power supply 102, voltages of +12 v, +5 v, +3.3 v, and −12 v are commonly provided.

The switching power supply 102 may include different functionalities and topologies. As will be recognized by those of skill in the art, typical topologies may include rectification, boost, buck, or other topologies. The switching power supply 102 may include various stages that combine one or more of these topologies in order provide one or more desired output voltages to the electronic device 104. The various stages of the switching power supply 102 allow the switching power supply 102 or stages within the switching power supply 102 to perform different functions such as rectification, voltage or current conversion, frequency changing, inversion, etc.

In various embodiments, the electronic device 104 may be a computer system, such as a desktop, laptop, or server, and the switching power supply 102 may be configured to provide power to the various components of the computer system. In other embodiments, the electronic device 104 may include devices such as routers, switches, personal digital assistants (PDAs), displays, appliances or other electronic devices as recognized by one of skill in the art. In one embodiment, the switching power supply 102 may be implemented within the same enclosure as the electronic device 104, such as within a computer tower case. In other embodiments, the switching power supply 102 may be implemented external to the electronic device 104 and may be connected to the electronic device 104 via a connection means such as a cord, cable, or bus such as in a blade center.

The electronic device 104 causes a load 106 to be applied to the switching power supply 102. The amount of load 106 may affect the performance of the switching power supply 102. The switching power supply 102 is preferably configured to operate efficiently in conjunction with a given load 106. In one embodiment, the load 106 may vary depending on the operational characteristics of the electronic device 104 and the switching power supply 102 is typically configured to adjust accordingly. For example, the switching power supply 102 may include a feedback loop for adjusting the power output characteristics of the switching power supply 102 in response to changes in the load 106. Typically, the switching power supply 102 regulates the voltage on the regulated bus 108 so as to provide substantially constant voltage levels to the electronic device 104 under varying load conditions.

In some circumstances, the electronic device 104 may be turned off, disconnected, idled, may be operated in a standby or hibernate type mode, etc. or in some other way may be operated at a reduced power level. In such a situation, the load 106 may become very low and, in some cases, the load 106 may become zero or very close to zero. When the load 106 decreases below a particular threshold, for example below 10-40% of the operating capacity, the switching power supply 102 may begin to substantially decrease in efficiency due to switching losses in the switching power supply 102.

The present system 100, as will be described in detail below, operates a regulation stage of the switching power supply 102 to adjust from a high power reference voltage, or normal operating reference voltage, to a low power reference voltage when the load 106 falls below a minimum power capacity threshold such that the overall efficiency of the switching power supply 102 is increased at light load. A reference voltage is the voltage used by a stage controller to regulate the output voltage of the stage. For example, if the reference voltage is set to 400 volts ("V"), then the output voltage of the stage will be substantially maintained close to 400 V with some acceptable steady-state variation above and below the reference voltage and momentary deviations from 400 V under transient load conditions. By using a lower reference voltage at low loads in at least one stage of the switching power supply 102, the switching power supply 102 is able to continue providing sufficient power to the load 106 while the efficiency of the switching power supply 102 for the light load condition.

In at least one embodiment, the switching power supply 102 may operate such that it meets Environmental Protection Agency (EPA) requirements. For example, a current EPA standard requires the switching power supply 102 to operate with at least 80% efficiency at 20% of the full load capacity of the switching power supply 102. Thus, the reference voltage (e.g. 400 V) may be adjusted down to a low power reference voltage (e.g. 320 V) to meet the efficiency requirements.

However, adjusting the reference voltage to increase efficiency might adversely affect a hold-up time for a regulated output voltage in the event of a loss of input voltage. Therefore, the present system 100 may also include additional modules to provide stored energy to a regulation stage of the switching power supply 102 in the event of a loss of input voltage such that hold-up time requirements are satisfied.

Figure 2:
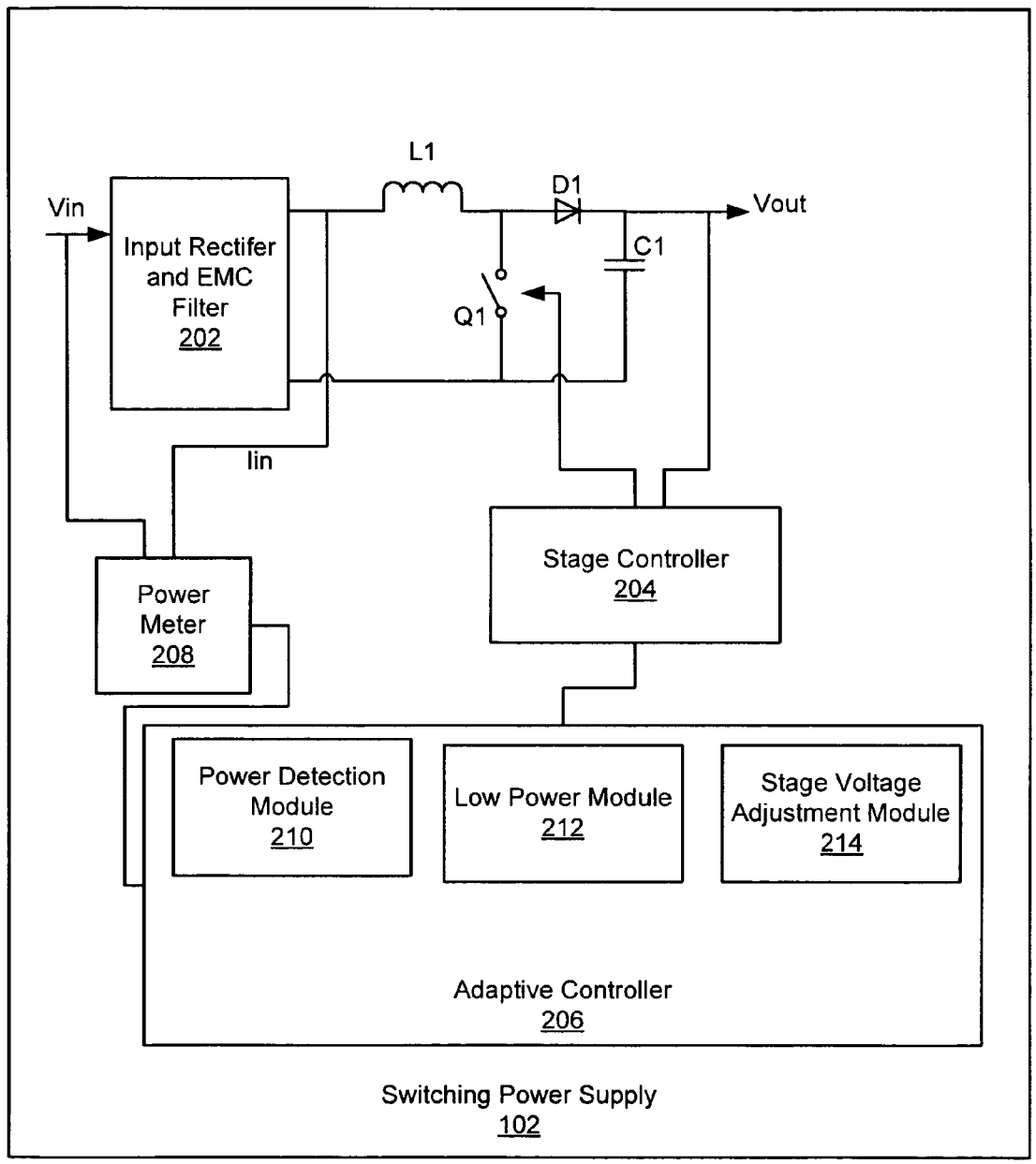
FIG. 2 is a schematic block diagram illustrating one embodiment of a switching power supply in accordance with the present invention.

FIG. 2 is a schematic block diagram illustrating one embodiment of a switching power supply 102 in accordance with the present invention. As depicted, the switching power supply 102 includes an input rectifier and electromagnetic compatibility ("EMC") filter 202. A rectifier is a device that converts alternating current ("AC") to direct current ("DC") in a process known in the art as rectification. An EMC filter is a device that filters out certain frequencies and prevents the propagation of unwanted electromagnetic interference. Thus, the input rectifier and EMC filter 202 may receive an input voltage Vin in the form of an AC voltage, such as 120 V AC as provided via a conventional wall socket, and pass a rectified and filtered DC voltage to the input of a regulation stage of the switching power supply 102.

The regulation stage of the switching power supply 102, as depicted, is in the form of a boost converter. The boost converter includes an inductor L1, a switch Q1, a diode D1, and a capacitor C1 configured as shown to provide a regulated output voltage Vout that is higher than a DC voltage at the input of the boost converter. The boost converter may provide the output voltage Vout to an electronic device 104 or other load, or to another stage for additional processing. As will be recognized by one of skill in the art, numerous other switching power supply topologies and configurations may be used in accordance with the present invention, such as other boost- or buck-derived topologies.

A stage controller 204 operates to control the switch Q1 in order cause a voltage across the capacitor C1 that is greater than the input voltage. The stage controller 204 switches the switch Q1 on and off for a particular duty cycle such that the stage output voltage Vout is maintained at or near a particular reference voltage, or in the case of a boost converter, at or near a boost reference voltage. Q1 is preferably a metal-oxide-semiconductor field-effect transistor ("MOSFET"), but other types of switches and transistors may be used in various configurations as will be recognized by one of skill in the art.

In one embodiment, the output voltage Vout is sensed and provided back to the stage controller 204 in a feedback loop so that the output voltage Vout can be compared to a predefined reference voltage and the duty cycle adjusted, such that the output voltage Vout is controlled to a voltage proportional to the reference voltage. For example, the reference voltage may be set to control the output voltage Vout to approximately 400 V. In this manner, a substantially constant output voltage Vout can be regulated and maintained at a nearly constant voltage level.

In conventional power supplies, the reference voltage of a regulation stage is typically set to a predefined voltage and remains there for the duration of operation of the power supply. However, in accordance with the present invention, the switching power supply 102 may include an adaptive controller 206 and a power meter 208 for adjusting the reference voltage in order to increase the efficiency of the switching power supply 102 at light load. The adaptive controller 206 operates to adjust the output voltage Vout of the switching power supply 102 in response to changes in the amount of load 106 placed on the switching power supply 102. For example, the adaptive controller 206 may cause the switching power supply 102 to operate at a different output voltage Vout at lower loads in order to increase efficiency. To accomplish this, the adaptive controller 206 may include a power detection module 210, a low power module 212, and a stage voltage adjustment module 214, which are described below.

The power detection module 210 detects an amount of power being used by the switching power supply 102 at a particular time. Typically, the amount of power used by the switching power supply 102 is indicative of the size of load 106 that is on the switching power supply 102.

In one embodiment, the power detection module 210 works in conjunction with the power meter 208 by receiving a signal from the power meter 208. The signal indicates the amount of power being used by the switching power supply 102. In other embodiments, the power detection module 210 may be integrated within the power meter 208, or the power meter 208 might make up the whole of the power detection module 210. For example, a switching power supply 102 may include a power meter 208 for other purposes and the power detection module 210 may receive an input power measurement from the power meter 208 and may scale or buffer the input power measurement, or may otherwise process the input power measurement to generate a signal useful to the adaptive controller 206. In another example, the switching power supply 102 does not include a power meter 208 and the power detection module 210 includes a power meter 208.

In one embodiment, the power meter 208 operates by detecting the input voltage Vin and the input current Iin and then multiplies the input voltage Vin and current Iin together to calculate the input power of the switching power supply 102. The product of Vin and Iin may also be multiplied by a conversion factor to account for conversion losses, efficiency of the rectifier 202, scaling, etc. In a case where the input to the switching power supply includes multiple phases, such as for a three-phase source, the measured signals Vin and Iin may be adjusted to correctly calculate input power. Of course, as will be recognized by those of skill in the art, there are numerous other ways to determine the amount of power used by the switching power supply 102 in accordance with the present invention. For example, the amount of power used by the switching power supply 102 might be detected at the output instead of the input and then adjusted as necessary for switching losses.

The low power module 212 is preferably configured to determine if the switching power supply 102 is operating below a minimum power capacity threshold based on the amount of power detected by the power detection module 210. For example, the minimum power capacity threshold might be set at 30% of the full load capacity of the switching power supply 102. Thus, the low power module 212 will detect each time the power use of the switching power supply 102 falls below 30% of its full load capacity.

In further embodiments, the low power module 212 may also detect when the amount of power rises above the minimum power capacity threshold. Preferably, the minimum power capacity threshold is set to a point at which an adjustment of the reference voltage in the regulation stage will result in significantly increased operating efficiency of the switching power supply 102. Typically, when the low power module 212 determines that the amount of power being used by the switching power supply 102 is below the minimum power capacity threshold, it communicates that information to the stage voltage adjustment module 214.

The stage voltage adjustment module 214 operates in conjunction with the stage controller 204 to adjust the reference voltage of the regulation stage from a high power reference voltage, or normal operating reference voltage, to a low power reference voltage in response to the low power module 212 determining that the switching power supply 102 is operating below the minimum power capacity threshold. For example, in a typical switching power supply 102, the high power reference voltage (or boost reference voltage in the depicted embodiment) may be set to regulate the output voltage Vout to about 400 V with a line input peak voltage of about 300 V.

In a boost topology the high power reference voltage is typically set to a voltage that is efficient and convenient for operation at higher loads. The high power reference voltage is typically greater than the low power reference voltage so that at light load, the output voltage Vout is reduced which typically results in a higher efficiency for the switching power supply 102 than if the output voltage Vout is maintained at the high power reference voltage. Typically, for a boost converter both the high power reference and the low power reference maintain the output voltage Vout higher than the rectified input voltage to the stage, thereby providing a boosted voltage at the output.

The invention also anticipates other power supply topologies and a high power reference voltage may be lower than a low power reference voltage such that raising the output voltage Vout at light load increases efficiency of the switching power supply 102. One of skill in the art will recognize how a reference voltage of a switching power supply 102 may be adjusted up or down at light load to increase efficiency.

In the depicted embodiment, if the amount of power used by the switching power supply 102 falls below the minimum power capacity threshold (e.g. below 30% of the full rated capacity of the switching power supply 102), then the stage voltage adjustment module 214 may adjust the reference voltage to a low power reference voltage, for example, to around 320 Volts. Thus, the regulation stage will operate to provide a regulated voltage Vout of around 320 Volts which will typically allow the switching power supply 102 to operate more efficiently while still meeting the demanded load requirements.

Preferably, the low power reference voltage is set to a point at which the switching power supply 102 receives the greatest increase in efficiency while still providing sufficient power to the load 106. In some embodiments, the switching power supply 102 may operate to perform active power factor correction in the regulation stage. In such a situation, it is also preferable to set the low power reference voltage to a point at which power factor correction remains substantially operable. In a boost converter, that point is typically around 20 Volts above the input line peak voltage. Thus, a power factor correction voltage threshold may be defined in some embodiments, wherein the power factor correction voltage threshold corresponds to a minimum regulated voltage Vout relative to the input voltage Vin at which active power factor correction continues to sufficiently operate.

In some embodiments, the low power reference voltage may be continuously adjusted or varied relative to the amount of power detected by the power detection module 210 in order to ensure that sufficient power is provided to the load 106. For example, if the low power module 212 determines that the switching power supply 102 is operating below the minimum power capacity threshold, then the reference voltage might initially be adjusted from 400 Volts to 340 Volts. Subsequently, the amount of power used by the switching power supply 102 might continue to decrease or increase, thereby allowing the stage voltage adjustment module 214 to continuously lower or raise the low power reference (e.g. between 320 and 340 Volts) voltage according to the amount of power demanded by the load 106. In this manner the feedback of the input voltage Vin and feedback from the power meter 208 allow the stage voltage adjustment module 214 to fine tune the reference voltage to provide optimal efficiency while still meeting operation requirements.

In one embodiment, the reference voltage is adjusted proportional to the amount of power consumed by the switching power supply 102. In another embodiment, the reference voltage is adjusted non-linearly with respect to the amount of power consumed by the switching power supply 102. In yet another embodiment, the reference voltage is adjusted in steps. Preferably, operation with the low power reference voltage results in the switching power supply 102 operating at least at 80% efficiency when operating at 20% of the full load capacity of the switching power supply 102.

Figure 3:
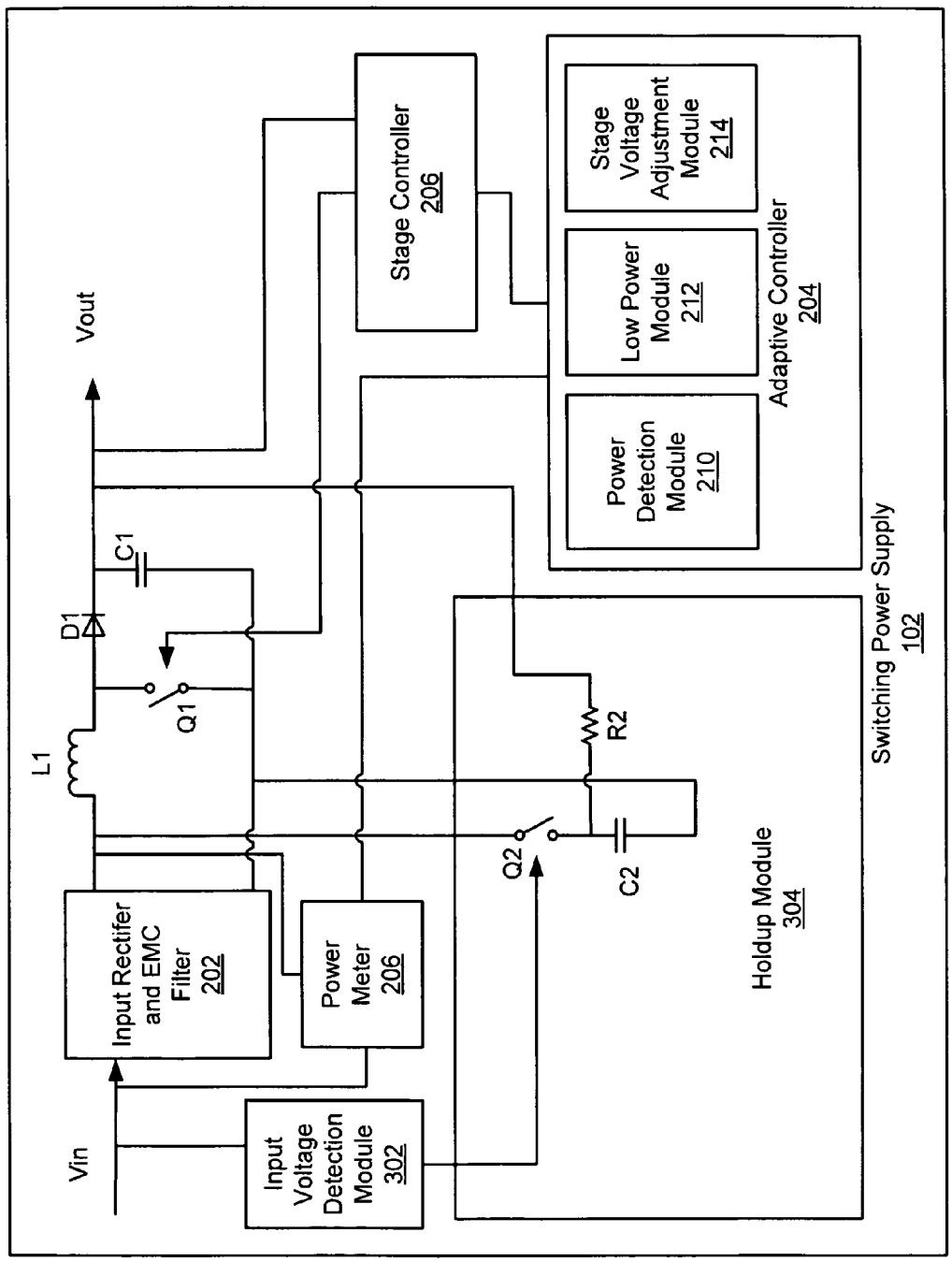
FIG. 3 is a schematic block diagram illustrating a further embodiment of a switching power supply in accordance with the present invention.

FIG. 3 is a schematic block diagram illustrating a further embodiment of a switching power supply 102 in accordance with the present invention. The further embodiment includes an input voltage detection module 302 and a holdup module 304. The holdup module 304 operates to provide sufficient stored energy to the regulation stage to maintain the regulated voltage Vout relative to the low power reference voltage for a predetermined period of time in response to a loss of the input voltage Vin. Thus, the holdup module 304 allows the regulation stage to satisfy a holdup time requirement in the event of a failure of the input voltage Vin. A typical holdup time requirement for power supplies might be around 20 milliseconds.

In a conventional power supply, the switching power supply 102 may include multiple stages where the output voltage Vout of the boost converter (or other topology) is connected to the input of the next stage. A holdup time may be implemented by using a high power reference voltage that is substantially higher than the line input peak voltage (e.g. a 400 Volt reference voltage with a 300 Volt input peak voltage). The next stage may be able to operate with a wide range of input voltages while still maintaining a regulated output voltage. If the input voltage Vin is lost, the capacitor C1 is charged to a voltage corresponding to the high power voltage reference and can supply energy to the next stage while the output voltage Vout decreases. The output voltage Vout eventually is reduced to a level where the next stage can no longer regulate its output. The time measured from loss of input voltage Vin until the switching power supply 102 can no longer regulate its output is called holdup time. Holdup time is typically measured at full load and may increase at light load. Often, a switching power supply 102 is designed with a holdup time of 20 milliseconds or longer.

Where another stage does not follow the boost stage, the holdup time would typically be measured as the time from loss of input voltage until the output voltage Vout is reduced to a lower specified limit. Thus, even in the event of a failure of the input voltage Vin, the regulation stage can continue to provide power for a predetermined period of time because of the large head voltage (e.g. 100 Volts) between the output voltage Vout and a minimum input voltage of the following stage. However, because the present invention adjusts the high power reference voltage (e.g. where Vout is 400 Volts) to a low power reference voltage (e.g. where Vout is 320 Volts), less energy is available to the next stage or to the load 106 before the output voltage Vout falls below a minimum acceptable level. One solution is to increase the size of capacitor C1. While this solution has some benefits, it also affects response time, cost, feedback control design, and takes more space.

The holdup module 304 is another solution to the holdup time reduction caused by operating at the low power reference voltage. In one embodiment, the holdup module 304 is merely additional capacitance. In another embodiment, the holdup module 304 includes controls and circuitry to provide energy for holdup time only when required without otherwise significantly affecting the switching power supply 102. The holdup module 304 depicted in FIG. 3 is a schematic drawing of one embodiment. One of skill in the art will recognize other forms of a holdup module 304.

In some embodiments, the holdup module 304 operates in conjunction with an input voltage detection module 302. In one embodiment, the input voltage detection module 302 detects a loss of the input voltage Vin by determining that the input voltage has fallen below a minimum input voltage threshold. In another embodiment, the input voltage detection module 302 includes a slope detector to monitor a slope of the input voltage Vin and detect when the input voltage Vin is decreasing at a rate greater than a predetermined threshold. Thus, if there is a failure or sudden drop in the input voltage Vin, the input voltage detection module 302 detects the failure and notifies the holdup module 304 of the failure.

The holdup module 304 operates to provide stored energy to the regulation stage so that operation of the switching power supply 102 continues for a predetermined holdup time. In the depicted embodiment, the holdup module 304 includes a capacitor C2 and a switch Q2. The capacitor C2 is used to store energy sufficient to meet a holdup time requirement when the input voltage is lost while the regulated voltage Vout is set to the low power reference voltage. The switch Q1 operates to provide the energy stored in the capacitor C2 to the regulation stage in response to the input voltage detection module 302 detecting a loss of input voltage Vin. This is typically accomplished when the input voltage detection module 302 sends a signal to the switch Q2 which causes the switch Q2 to close thereby coupling the capacitor C2 and its stored energy with the rest of the regulation stage circuitry. The capacitor C2 is typically trickle charged via a resistor R2 or other circuitry to initially store the needed energy. Of course, one of skill in the art will recognize that other embodiments in accordance with the present invention may include different or additional circuitry components and/or logic to achieve the desired holdup time.

Figure 4:
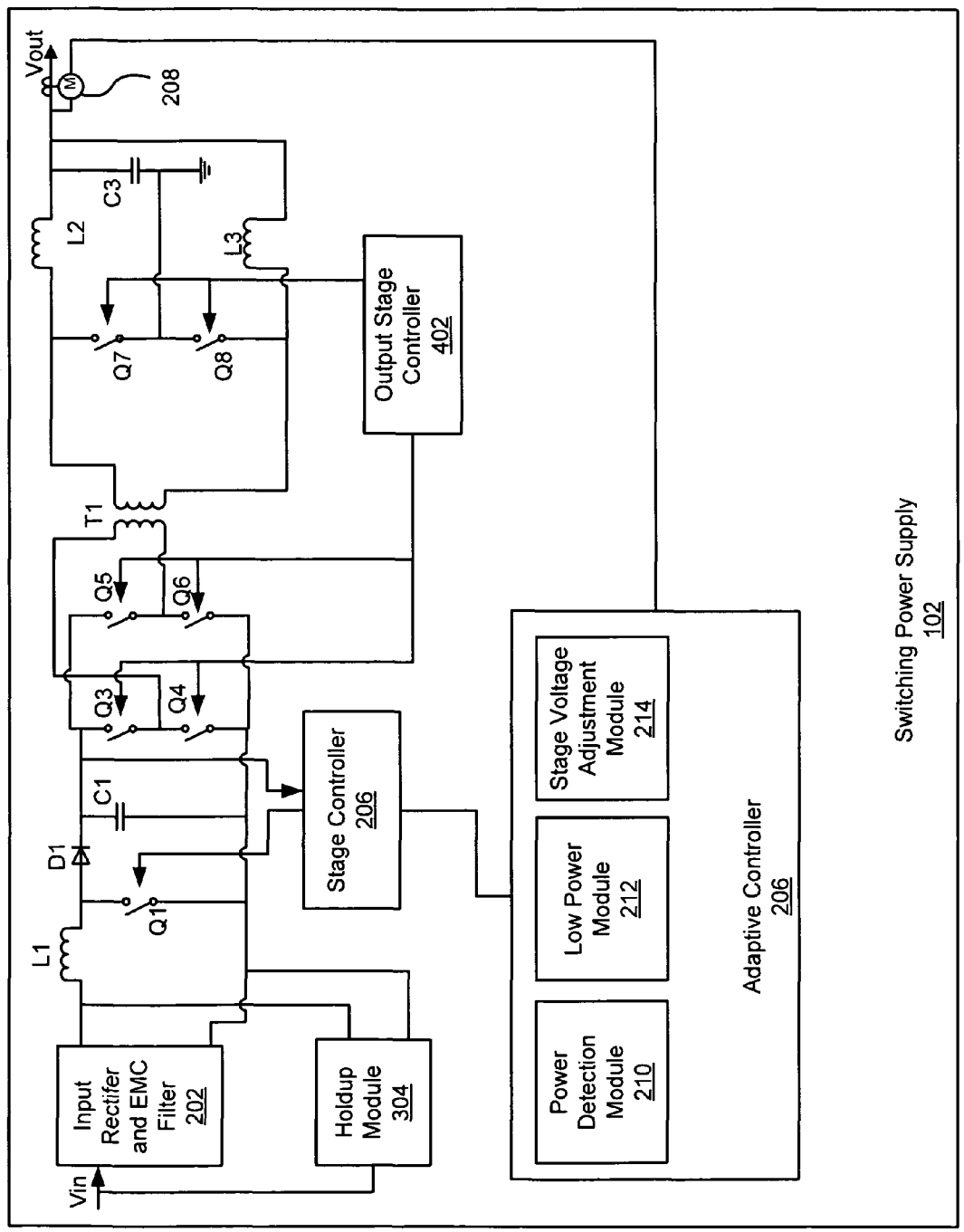
FIG. 4 is a schematic block diagram illustrating a further embodiment of a switching power supply in accordance with the present invention.

FIG. 4 is a schematic block diagram illustrating yet a further embodiment of a switching power supply 102 in accordance with the present invention. The further embodiment depicts an output stage coupled with the previously described regulation stage wherein the power meter 208 is implemented at the output of the switching power supply 102 instead of at the input. The output stage includes a phase-shift full-bridge topology with an output stage controller 402 for regulating the output voltage Vout. The output stage controller 402 regulates the output voltage Vout by switching on and off the various switches Q3-Q7 at particular timing intervals and with a particular duty cycle.

The phase-shift full-bridge includes four switches Q3-Q6 arranged as a full-bridge rectifier. The rectifier circuit includes a first switch Q3 and a second switch Q4 in series between a power source (or output of an input stage, i.e. across capacitor C1) and ground, and a third switch Q3 and a fourth switch in series between the output of the regulation stage and ground. A transformer T1 is coupled to a node between the first switch Q3 and the second switch Q4 and is coupled to a node between a third switch Q5 and a fourth switch Q6. The switches Q3-Q6 are controlled by the output stage controller 402 to pass energy through the transform T1 to the rest of the circuitry in the output stage.

For example, the switches Q3-Q6 may be alternatively turned off and on in various patterns and configurations to cause a current to flow through the input side of the transformer T1 in one direction and then in the opposite direction. In one embodiment, the first and fourth switches Q3, Q6 may be turned on and the second and third switches Q4, Q5 may be turned off thereby causing a current path to be created through the first and fourth switches such that current travels through the first switch Q3 to the top input node of the transformer T1, through the transformer T1, and back through the fourth switch Q6. Conversely, if the first and fourth switches Q3, Q6 are turned off, and the second and third switches Q4, Q5 are turned on, then current will flow through the transformer T1 in the opposite direction.

In one embodiment, by timing the switching between turning on/off the first and fourth switches Q3, Q6 and turning on/off the second and third Q4, Q5 switches and utilizing parasitic capacitance of the switches Q3-Q6, zero voltage switching can be implemented as will be recognized by one of skill in the art. By operating with zero voltage switching, the switching power supply 102 can operate even more efficiently at low loads.

Once the energy is passed through the transformer T1, the output stage controller 402 controls one or more additional switches Q7, Q8 to pass current through inductors L2, L3 in order to maintain a voltage Vout across the capacitor C3 for use by the load 106. Again, as will be recognized by those of skill in the art, numerous additional topologies may be implemented in the output stage including, in particular, boost-type and buck-type topologies. Additionally, numerous other configurations of the described modules may be possible. For example, the modules depicted within the switching power supply 102 may, in some embodiments, be implemented outside the switching power supply 102 or may be implemented in other configuration not depicted as will be recognized by one of skill in the art.

Figure 5:
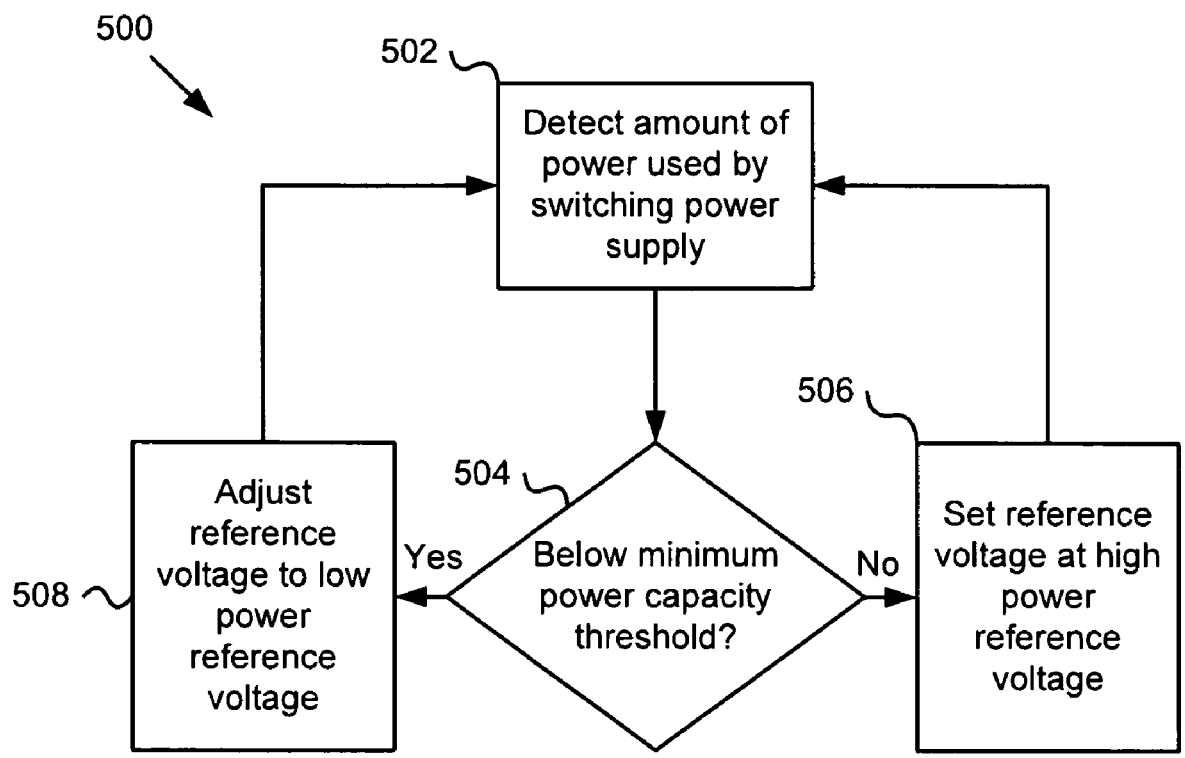
FIG. 5 is a schematic flow chart diagram illustrating one embodiment of a method for operating an adaptive high efficiency switching power supply in accordance with the present invention.

FIG. 5 is a schematic flow chart diagram illustrating one embodiment of a method 500 for operating an adaptive high efficiency switching power supply 102 in accordance with the present invention. The method 500 substantially includes the modules and embodiments described above with regard to the system 100 and the switching power supply 102.

The method 500 begins when the power detection module 210 detects 502 an amount of power used by a switching power supply 102. The amount of power used by the switching power supply 102 is indicative of the size of load 106 that is drawing power from the switching power supply 102. As described above, the switching power supply 102 typically includes a regulation stage with a stage controller 204 that operates to regulate a voltage Vout of the regulation stage relative to a reference voltage, or in the case of a boost converter as depicted in FIG. 2, relative to a boost reference voltage.

The low power module 212 determines 504 if the switching power supply 102 is operating below a minimum power capacity threshold based on the amount of power detected by the power detection module 210. For example, in certain embodiments, the minimum power capacity threshold might be set to about 20% of the full load capacity of the switching power supply 102. In such a case, the low power module 212 would determine whether the switching power supply 102 is operating below 20% of its full load capacity.

If the switching power supply 102 is not operating below the minimum power capacity threshold, the reference voltage is set 506 or maintained at the high power reference voltage and the regulation stage continues normal operation. However, if the switching power supply 102 is operating below the minimum power capacity threshold, the stage voltage adjustment module 214 adjusts 508 the reference voltage from its high power reference voltage, or normal operating voltage, to a low power reference voltage. The low power reference voltage causes a regulated voltage Vout adjustment such that the switching power supply 102 operates more efficiently below the minimum power threshold than if the reference voltage remained at the high power reference voltage during operation below the minimum power threshold. Thus, by adjusting the reference voltage, or boost voltage, of the regulation stage, the efficiency of the switching power supply 102 is increased. Preferably, the efficiency is increased to at least above 80% efficiency when the switching power supply 102 is operating at 20% of its full load capacity.

The method 500 then returns to detect 502 the amount of power used by the switching power supply 102. In some embodiments, the low power reference voltage might be continuously varied by the stage voltage adjustment module 214 to cause the switching power supply 102 to operate with optimal efficiency while still meeting the power demands of the load 106 and maintaining operation of active power factor correction. In this manner, the efficiency of the switching power supply 102 can be significantly increased with a minimal increase in cost of implementation.

Figure 6:
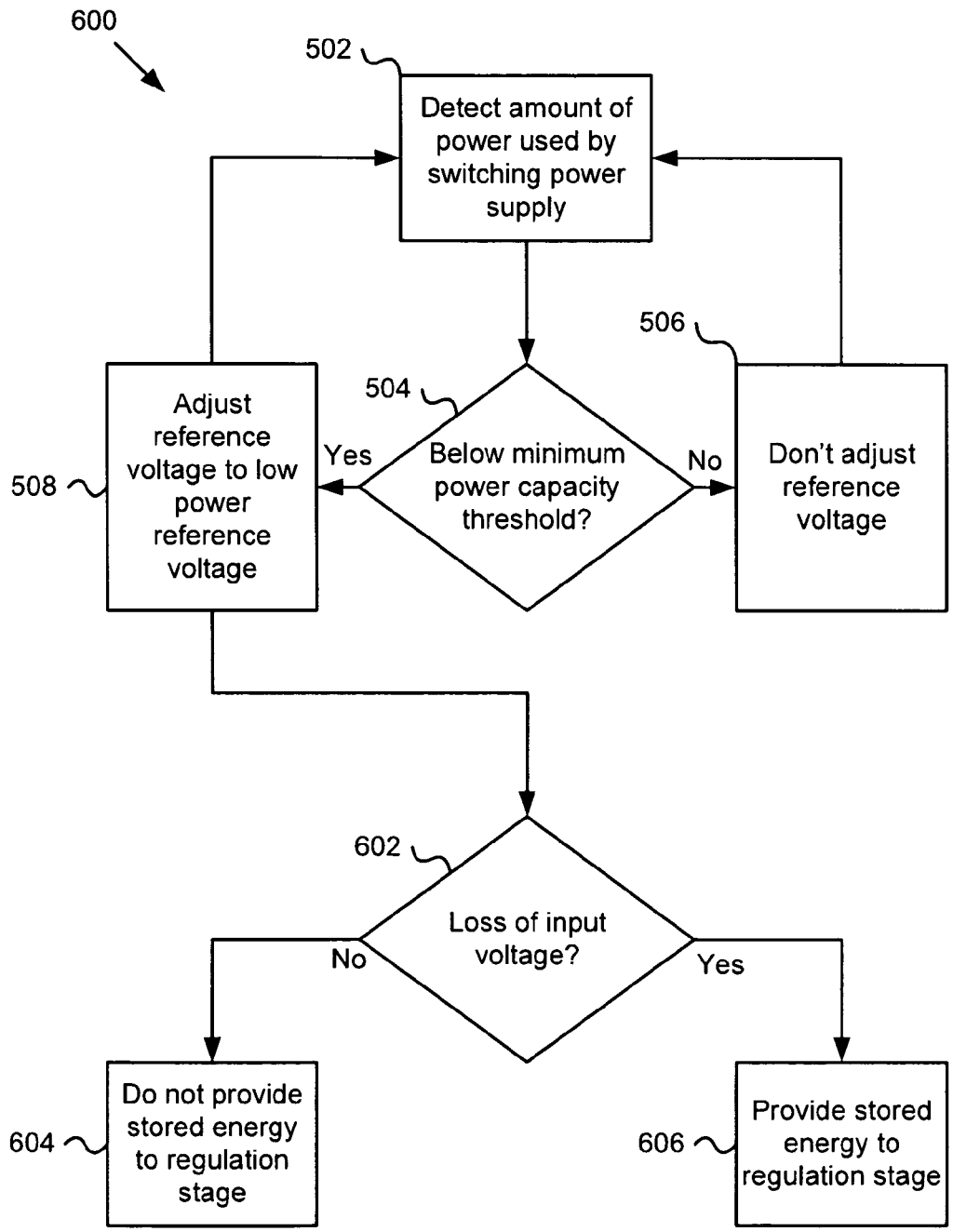
FIG. 6 is a schematic flow chart diagram illustrating an additional embodiment of a method for operating an adaptive high efficiency switching power supply in accordance with the present invention.

FIG. 6 is a schematic flow chart diagram illustrating an additional embodiment of a method 600 for operating an adaptive high efficiency switching power supply 102 in accordance with the present invention. The method 600 includes the steps described above with regard to the method 500 with additional steps for meeting a holdup time requirement in the event of a loss of input voltage Vin.

Typically, when the switching power supply 102 is operating below the minimum power capacity threshold and the reference voltage has been adjusted to a value closer to the input peak voltage, it might be desirable to implement additional circuitry or logic to provide stored energy to the regulation stage in the event of a failure or loss of input voltage Vin. Of course, although not depicted, it might be desirable in some embodiments to operate the holdup module 304 even when operating above the minimum power capacity threshold.

As depicted, the method 600 continues from the method 500 when the input voltage detection module 302 determines 602 whether there has been a loss of input voltage Vin. In one embodiment, this may be accomplished when input voltage detection module 302 detects that the input voltage Vin has fallen below a minimum allowable input voltage threshold. In a further embodiment, a slope detector may be used to detect that the input voltage Vin is decreasing at a rate greater than a predetermined slope threshold thereby indicating that the input voltage Vin is failing or has failed.

If the input voltage detection module 302 determines 602 that there is not a failure of loss of input voltage Vin, then the holdup module 304 does not provide 604 any stored energy to the regulation stage of the switching power supply 102. However, if the input voltage detection module 302 determines 602 that there is a loss of input voltage Vin, then the holdup module 304 operates to provide 606 sufficient stored energy to the regulation stage to maintain the regulated voltage Vout for the predetermined holdup time. For example, the switching power supply 102 might have a holdup time requirement of 20 milliseconds, in which case the holdup module 304 provides energy sufficient for the regulation stage to provide output voltage Vout within acceptable limits for at least 20 milliseconds after the loss of input voltage Vin.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for efficiently regulating a power supply, the apparatus comprising:
    a power detection module that detects an amount of power used by a multi-stage switching power supply, the switching power supply comprising a regulation stage with a stage controller that operates to regulate an intermediate voltage of the regulation stage relative to a set point reference voltage, the multi-stage switching power supply further comprising an output stage that receives as an input voltage the intermediate regulated voltage of the regulation stage, the output stage regulating an output voltage of the power supply to a regulated output voltage level;

a low power module that determines if the amount of power used by the switching power supply is below a minimum power capacity threshold; and a stage voltage adjustment module that adjusts the set point reference voltage from a high power reference voltage to a low power reference voltage in response to the low power module determining that the amount of power used by the switching power supply is below the minimum power capacity threshold, the low power reference voltage causing a regulated intermediate voltage adjustment such that the switching power supply operates more efficiently below the minimum power threshold than if the reference voltage remained at the high power reference voltage during operation below the minimum power threshold, wherein the output voltage of the output stage is maintained at the regulated output voltage level.

2. The apparatus of claim 1, wherein the regulation stage is a boost converter stage configured to provide a regulated intermediate voltage that is greater than an input voltage.

3. The apparatus of claim 2, wherein the regulated intermediate voltage is maintained above a minimum regulation voltage threshold relative to the input voltage.

4. The apparatus of claim 3, wherein the regulated intermediate voltage when the reference voltage is at the high power reference voltage is greater than the regulated intermediate voltage when the reference voltage is at the low power reference voltage.

5. The apparatus of claim 1, wherein the regulation stage operates to perform active power factor correction.

6. The apparatus of claim 5, wherein the regulated intermediate voltage when the reference voltage is at the low power reference voltage is greater than a power factor correction voltage threshold, the power factor correction voltage threshold corresponding to a minimum regulated intermediate voltage relative to an input voltage at which active power factor correction remains substantially operable.

7. The apparatus of claim 1, wherein the stage voltage adjustment module adjusts the low power reference voltage continuously relative to the amount of power detected by the power detection module.

8. The apparatus of claim 1, further comprising a holdup module that operates to provide sufficient stored energy to the regulation stage to maintain the regulated intermediate voltage relative to the low power reference voltage for a predetermined period of time in response to a loss of an input voltage.

9. The apparatus of claim 8, further comprising an input voltage detection module that detects the loss of the input voltage by determining that the input voltage has fallen below a minimum input voltage threshold.

10. The apparatus of claim 8, further comprising an input voltage detection module that detects the loss of the input voltage by monitoring a slope of the input voltage and detecting that the input voltage is decreasing at a rate greater than a predetermined slope threshold.

11. The apparatus of claim 8, wherein the holdup module comprises a capacitor and a switch, the capacitor storing energy sufficient to maintain the regulated intermediate voltage relative to the low power reference voltage for the predetermined period of time, the switch configured to provide the stored energy to the regulation stage in response to the loss of the input voltage.

12. The apparatus of claim 8, wherein the predetermined period of time is equal to or greater than about 20 milliseconds.

13. The apparatus of claim 1, wherein adjusting to the low power reference voltage results in the switching power supply operating at least at 80% efficiency when operating at 20% of the full load capacity of the switching power supply.

14. The apparatus of claim 1, wherein the stage voltage adjustment module adjusts the set point reference voltage from the low power reference voltage to the high power reference voltage in response to the low power module determining that the amount of power used by the switching power supply is above the minimum power capacity threshold.

15. A system comprising:

an electronic device comprising a load;

a multi-stage switching power supply that provides power to the load of the electronic device, the switching power supply comprising:

a regulation stage with a stage controller that operates to regulate an intermediate voltage of the regulation stage relative to a set point reference voltage;

an output stage that receives as an input voltage the intermediate regulated voltage of the regulation stage, the output stage regulating an output voltage of the power supply to a regulated output voltage level;

a power detection module that detects an amount of power used by the switching power supply;

a low power module that determines if the amount of power used by the switching power supply is below a minimum power capacity threshold; and a stage voltage adjustment module that adjusts the set point reference voltage from a high power reference voltage to a low power reference voltage in response to the low power module determining that the amount of power used by the switching power supply is below the minimum power capacity threshold, the low power reference voltage causing a regulated intermediate voltage adjustment such that the switching power supply operates more efficiently below the minimum power threshold than if the reference voltage remained at the high power reference voltage during operation below the minimum power threshold, wherein the output voltage of the output stage is maintained at the regulated output voltage level.

16. The system of claim 15, wherein the switching power supply further comprises an input filter that rectifies an alternating current ("AC") input voltage and filters out harmonic content.

17. The system of claim 15, wherein the electronic device is one of a computer, router, switch, personal digital assistant, appliance, and digital media player.

18. The system of claim 15, further comprising a holdup module that operates to provide sufficient stored energy to the regulation stage to maintain the regulated intermediate voltage relative to the low power reference voltage for a predetermined period of time in response to loss of an input voltage, wherein the holdup module comprises a capacitor and a switch, the capacitor storing the energy, the switch configured to provide the stored energy to the regulation stage in response to the of failure of the input voltage.

19. A computer program product comprising a computer readable medium having computer usable program code stored on a tangible medium and executable on a processor for efficiently regulating a power supply, the operations of the computer program product comprising:

detecting an amount of power used by a multi-stage switching power supply, the switching power supply comprising a regulation stage with a stage controller that operates to regulate an intermediate voltage of the regulation stage relative to a set point reference voltage, the multi-stage switching power supply further comprising an output stage that receives as an input voltage the intermediate regulated voltage of the regulation stage, the output stage regulating an output voltage of the power supply to a regulated output voltage level;

determining if the amount of power used by the switching power supply is below a minimum power capacity threshold; and adjusting the set point reference voltage from a high power reference voltage to a low power reference voltage in response to the low power module determining that the amount of power used by the switching power supply is operating below the minimum power capacity threshold, the low power reference voltage causing a regulated intermediate voltage adjustment such that the switching power supply operates more efficiently below the minimum power threshold than if the reference voltage remained at the high power reference voltage during operation below the minimum power threshold, wherein the output voltage of the output stage is maintained at the regulated output voltage level.

20. An apparatus for efficiently regulating a power supply, the apparatus comprising:

a power detection module that detects an amount of power used by a switching power supply, the switching power supply comprising a regulation stage with a stage controller that operates to regulate an intermediate voltage of the regulation stage relative to a set point reference voltage, wherein the regulation stage is a boost converter stage configured to provide a regulated intermediate voltage that is greater than an input voltage, and wherein the regulated intermediate voltage is maintained above a minimum regulation intermediate voltage threshold relative to the input voltage, the regulation stage operating to perform active power correction;

a low power module that determines if the amount of power used by the switching power supply is below a minimum power capacity threshold;

a stage voltage adjustment module that adjusts the set point reference voltage from a high power reference voltage to a low power reference voltage in response to the low power module determining that the amount of power used by the switching power supply is below the minimum power capacity threshold, the low power reference voltage causing a regulated intermediate voltage adjustment such that the switching power supply operates more efficiently below the minimum power threshold than if the set point reference voltage remained at the high power reference voltage during operation below the minimum power threshold;

an input voltage detection module that detects a loss of an input voltage by determining that the input voltage has fallen below a minimum input voltage threshold; and a holdup module that operates to provide sufficient stored energy to the regulation stage to maintain the regulated voltage relative to the low power reference voltage for a predetermined period of time in response to the input voltage detection module detecting a loss of the input voltage.

\* \* \* \* \*